United States Patent [19]

Umehara et al.

[11] Patent Number: 5,057,723
[45] Date of Patent: Oct. 15, 1991

[54] LINEAR MOTOR

[75] Inventors: Teruo Umehara, Hanyu; Seiki Takedomi, Fukaya; Kuninori Imai, Kanagawa; Takeji Shiokawa, Fuchu, all of Japan

[73] Assignee: Hitachi Metals, Ltd., Tokyo, Japan

[21] Appl. No.: 467,865

[22] Filed: Jan. 22, 1990

[30] Foreign Application Priority Data

Jan. 23, 1989 [JP] Japan .................................. 1-13351

[51] Int. Cl.$^5$ .......................................... H02K 41/00
[52] U.S. Cl. .......................................... 310/12; 310/90
[58] Field of Search ........................... 310/12, 90, 14

[56] References Cited

FOREIGN PATENT DOCUMENTS

| 0266064 | 3/1989 | German Democratic Rep. ... 310/12 |
| 0237848 | 11/1985 | Japan ................................. 310/12 |
| 0224855 | 10/1986 | Japan ................................. 310/12 |
| 0141956 | 6/1987 | Japan ................................. 310/12 |

Primary Examiner—Steven L. Stephan
Assistant Examiner—Judson H. Jones
Attorney, Agent, or Firm—McGlew & Tuttle

[57] ABSTRACT

A linear motor comprising a center yoke made of a ferromagnetic material; outer yokes made of a ferromagnetic material, having permanent magnets, each having magnetic poles on the inner and outer surfaces thereof and fixed to the inner surface of the outer yokes, and disposed outside the center yoke with both ends thereof being magnetically coupled; and a movable member having coils wound on the outer circumference thereof and axially movably disposed in a gap between the center yoke and the outer yokes, in which recesses are provided on the opposing surfaces of the center yoke and the movable member, and a static-pressure gas bearing is formed by providing an air intake vent connecting to these recesses.

3 Claims, 3 Drawing Sheets

LINEAR MOTOR

BACKGROUND OF THE INVENTION

This invention relates generally to a linear motor for use in the transfer of lens holders for ultrasonic microscopes, for example, and more particularly to a linear motor in which a thrust generating portion and a bearing portion are combined into one piece.

DESCRIPTION OF THE PRIOR ART

As a drive unit used for transferring lens holders for ultrasonic microscopes, a construction shown in a partially sectional side view (FIG. 1) and a partially sectional plan view (FIG. 2). In both figures, reference numeral 1 refers to a linear motor, usually called the voice-coil type linear motor. That is, the linear motor 1 comprises a center yoke 2 made of a ferromagnetic material; outer yokes 4 made of a ferromagnetic material, having permanent magnets 3 with magnetic poles on the inside and outside surfaces thereof and disposed outside of the center yoke 2 with both ends thereof being magnetically coupled; and a movable member 5. The movable member 5 having a coil 7 wound on the outer circumference thereof and disposed in a gap formed by the center yoke 2 and the outer yokes 4 in such a manner as to be movable axially, that is, in the left-right direction in FIGS. 4 and 5. Numeral 8 refers to a hanger for suspending the linear motor 1 by fixedly fitting to the upper part of the outer yokes 4. Numeral 9 is a guide formed into a square sectional outside shape, the left end thereof being connected to the lower end of the hanger 8. Numeral 10 refers to a slider formed into a hollow cylinder that is axially slidable via the guide 9 and a small gap. The left end of the slider 10 is connected to the movable member 5 via a connecting member 11, and a lens holder 12 is fixed to the right end thereof. A static pressure gas bearing is formed by providing a plurality of air intake vents 13 and a plurality of air inlets 14 on the guide 9, and an air exhaust vent 15 on the slider 10.

Fig. 3 is an enlarged sectional view taken along line A—A in FIG. 1. Like parts are shown by like reference numerals used in FIGS. 1 and 2. In FIG. 3, two connecting holes 16 are provided in the axial direction of the guide 9 and connected to the air intake vents 13 and the air inlets 14. The air intake vents 13 are provided on the four side surfaces of the guide 9.

With the above construction, when current flows alternately in opposite directions in the coil comprising the movable member 5, the coil, that is, the movable member 5 moves in the sidewise (left-right) direction in accordance with the Fleming's left-hand rule. In this case, if compressed air is kept flowing in the air intake vents 13 from a compresses-air source (not shown), compressed air is blown out of the air inlets 14 towards the slider 10 via the air intake vents 13 and the connecting hole 16, causing the guide 9 to float in the slider 10, thereby reducing friction between the guide 9 and the slider 10 to nil. Consequently, the slider 10 can be moved smoothly and accurately along the guide 9 by the movable member 5. As a result, the lens holder 12 fixed to the tip of the slider 10 can be moved in the axial direction without vibration. This leads to satisfactory microscopic observation by means of a lens (not shown) mounted on the lens holder 12.

With the conventional device, the center yoke 2 and the movable member 5 comprising the linear motor 1 are constructed so as to perform relative motion in a non-contact state. This is because the two component members, allowed to move in a contact-slide state, would generate vibration in the vertical and horizontal directions, causing the lens holder 12 to vibrate, thereby significantly affecting microscopic observation or measuring reliability. To prevent this, a static-pressure gas bearing is formed between the movable member 5 and the guide 9 in a state where the movable member 5 is connected to the slider 10. This arrangement, however, tends to increase the size of the entire device, and require much time in mounting, removing or positioning a test specimen. In addition, the large distance between the static-pressure gas bearing portion and the movable member 5 tends to cause the length of the over-lapped portion of the guide 9 and the slider 10, which forms the static-pressure bearing portion, to change in accordance with the movement of the movable member 5. To cope with this, the pressure and/or flow rate of air to be fed must be finely controlled with troublesome operations. In a device involving a larger stroke, the aforementioned problem could be further aggravated. On the other hand, as there is a growing need in recent years for higher speed, it is necessary to make this type of device smaller in size and lighter in weight. However, the abovementioned linear motor of the conventional type, in which the drive and support sections are separately provided, cannot satisfy these requirements.

As a linear motor having an air bearing portion where a thrust generator and a bearing are integrated, a proposal disclosed in Japanese Laid-Open Utility Model Application No. 10078/1986 is known. The proposal is concerned with a linear motor comprising a centrally disposed yoke, a plurality of movable coils continuously arranged in such a manner as to surround the yoke with a small gap provided with the outer circumference of the yoke, a permanent magnet disposed on one side or both sides of the coils with an appropriate gap with the outer circumference of the coils, in which an air layer is formed between the outer circumference of the centrally disposed yoke and the inside surface of the movable coils by feeding compressed air into the inside surface of the movable coils. With the above construction, in which the thrust generator and the bearing are integrated, the effects of making the device smaller in size and lighter in weight can be accomplished, compared with the abovementioned linear motor of the conventional type. In the linear motor proposed in the above Japanese Laid-Open Utility Model Application, an air passage and a plurality of grooves connecting to the air passage have to be provided on bobbins comprising of the movable coils. This poses a limitation in manufacturing thin-walled bobbin, making it difficult to achieve a substantial reduction in the size and weight of the linear motor. In addition, the linear motor proposed in the above Laid-Open Utility Model Application involves a plurality of grooves provided on the inside surface of the bobbins. This would result in troublesome machining operations and encounter the difficulty in accomplishing high-precision machining. Thus, the proposed linear motor cannot be applied to those uses where vibration components of less than 0.1 μm are required.

SUMMARY OF THE INVENTION

It is the first object of this invention to provide a small-sized linear motor in which the thrust generator and the bearing are integrated.

It is the second object of this invention to provide a high-precision linear motor which involves very small vibration components at the time of travelling and stop of the motor.

It is the third object of this invention to provide a linear motor in which the movable members or coils can be prevented from being heated, and feeding current and thurst can be increased.

DETAILED DESCRIPTION OF THE EMBODIMENTS

Figure 1:
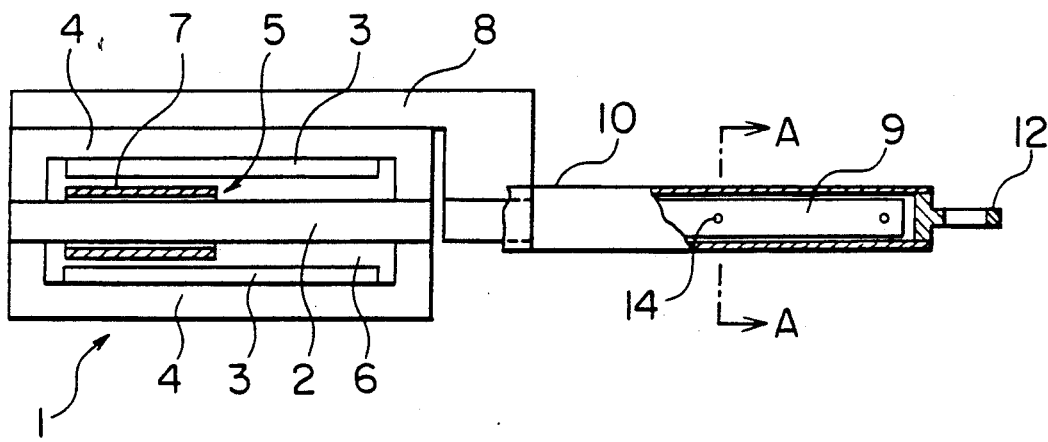
FIGS. 1 and 2 are partially sectional side view and a partially sectional plan view, respectively, of a drive unit of a conventional type.
Figure 2:
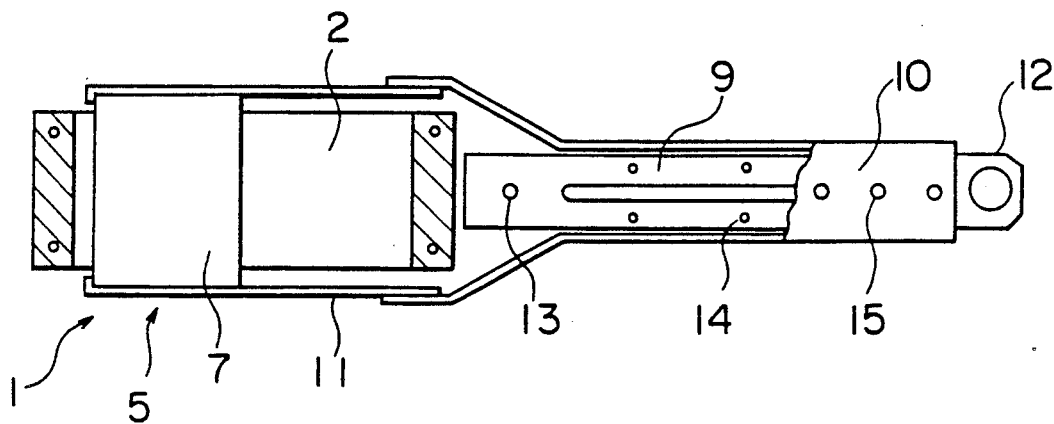
Figure 3:
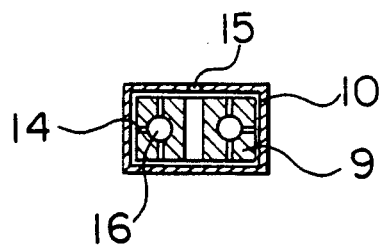
FIG. 3 is an enlarged sectional view taken along line A—A in FIG. 1.
Figure 4:
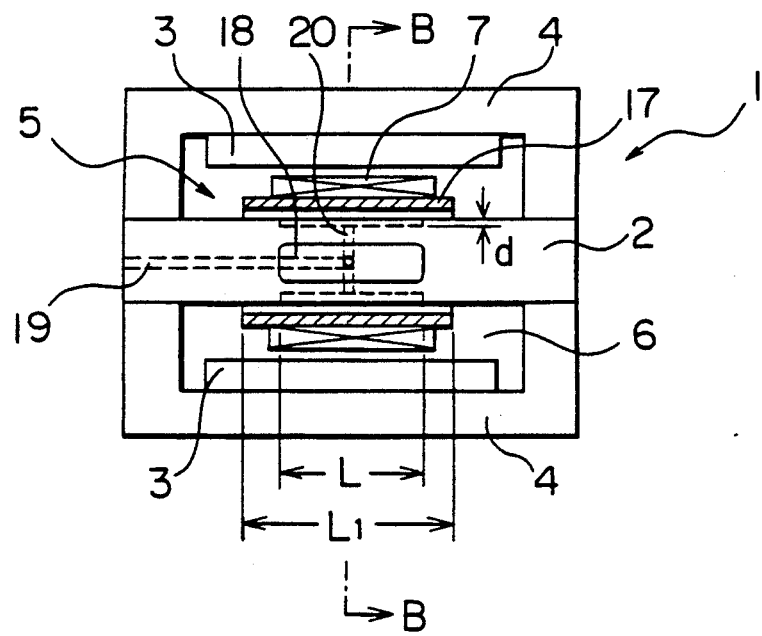
FIG. 4 is a partially sectional side view illustrating the first embodiment of this invention.
Figure 5:
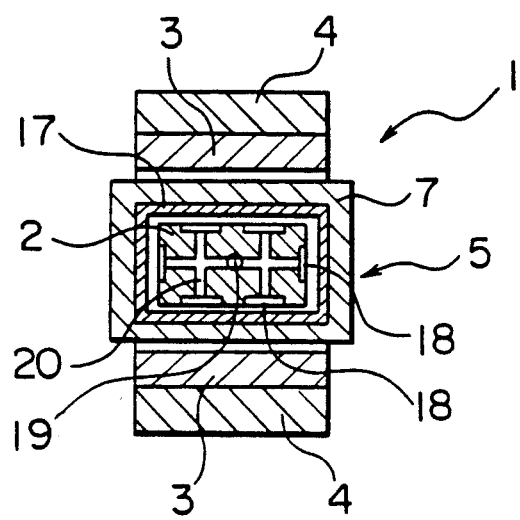
FIG. 5 is a sectional view taken along line B—B in FIG. 4.

FIG. 4 is a partially sectional side view illustrating the first embodiment of this invention. FIG. 5 is a sectional view taken along line B-B in FIG. 4. Like parts are indicated by like numerals used in FIGS. 1 through 3. In FIGS. 4 and 5, a linear motor 1 has such a construction that a center yoke 2 made of a ferromagnetic material, such as mild steel, and outer yokes 4 made of a' ferromagnetic material, such as mild steel, are magnetically coupled at both ends thereof in the longitudinal direction, permanent magnets 3 each having magnetic poles on the inside and outside surfaces thereof are fixed to the inside surface of the outer yokes 4, and a movable member 5 is axially movably disposed in a gap 6 formed between the center yoke 2 and the permanent magnets 3. Numeral 17 denotes a sleeve made of a non-magnetic material, such as aluminum, formed into a hollow square cylindrical shape, and axially movably disposed in a non-contact state by providing an approximately 10 $\mu$m gap between the sleeve 17 and the outer circumferential surface of the center yoke 2. A movable member 5 is formed by winding a coil 7 on the outer circumferential surface of the sleeve 17. Next, a plurality of recesses 18 having an axial length of L are provided on the outer circumferential surface of the center yoke 2; the depth d of the recesses 18 being approximately 50 $\mu$m and the relationship between the axial length L and the axial length $L_1$ of the sleeve 17 being $L_1$ L. Numeral 19 denotes an air intake vent which opens to an end face of the center yoke 2 and is connected to an air inlet 20 opening to the center of the recesses 18.

With the above construction, when the air intake vent 19 is connected to a supply source (not shown) of compressed gas, such as air or nitrogen, the compressed gas blows out of the air intake vent 19 via the air inlet 20 into the recesses 18 provided opposite to the sleeve 17. Thus, the sleeve 17 floats without coming into contact with the center yoke 2, forming a so-called static-pressure gas bearing. In this state, as current flows alternately in opposite directions in the coil 7 comprising the movable member 5, the coil 7, that is, the movable member 5 can be moved in the sidewise (left-right) direction, that is, in the axial direction, in accordance with Fleming's left-hand rule. The stroke of the movable member 5 at this time is the difference between the sleeve length and the axial length of the recesses 18 ($L_1$-L). In this way, the movable member 5 can perform the functions of both the thrust generator and the bearing in conjunction with the center yoke 2. Thus, when an appropriate lens holder is provided on the movable member 5, the linear motor can be used effectively as a drive unit for an ultrasonic microscope.

Figure 6:
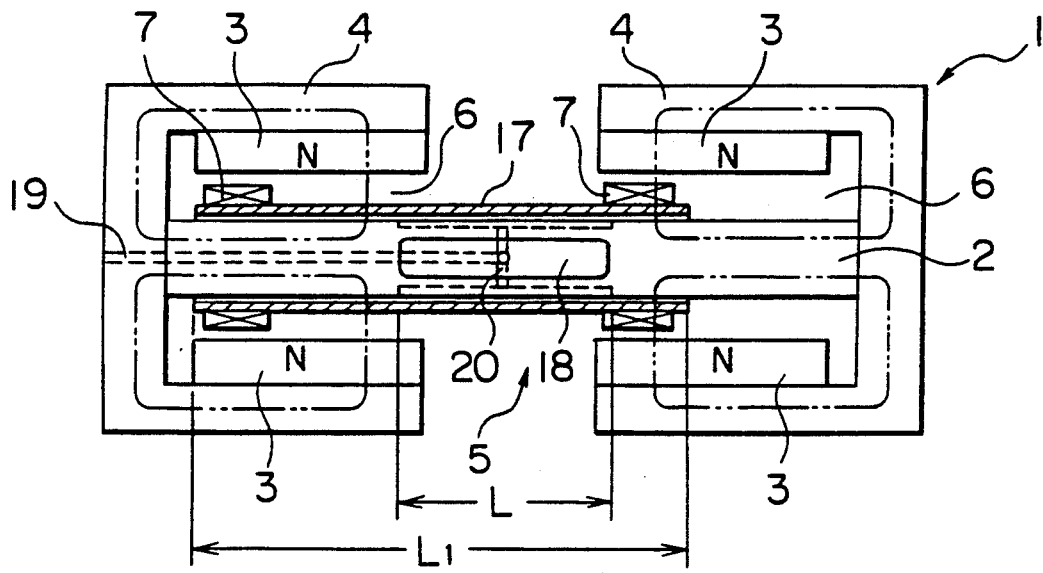
FIGS. 6 and 7 are partially sectional side views illustrating the second and third embodiments, respectively, of this invention.

FIG. 6 is a partially sectional side view illustrating the second embodiment of this invention. Like parts are indicated by like numerals used in FIGS. 4 and 5. In FIG. 6, the outer yokes 4 are formed by splitting in halves at the center thereof. That is, two U-shaped pieces of the outer yokes 4 are fixed to both end faces of the center yoke 2 by means of bolts (not shown), for example, and magnetically coupled with each other. At the same time, the permanent magnets 3 fixed to the inside surface of the outer yokes 4 are formed in such a manner that magnetic poles of the same polarity (the N pole, for example) appear on the inside surface of the permanent magnets 3. Next, the coils 7 comprising the movable member 5 are wound in the same direction on the outer circumferential surface of both ends of the sleeve 17.

With the above construction, two groups of right-hand and left-hand magnetic fluxes as shown by alternate long and short dash lines in FIG. 6 can be formed between the center yoke 2 and the outer yokes 4. Furthermore, since the coils 7 are disposed in each of the magnetic fluxes, the movable member 5 can be moved in the axial direction, as in the case of the first embodiment, as current flows in the coils 7. In this case, the stroke of the movable member 5 can be increased because the outer yokes 4 and the coils 7 are disposed in a split form. In other words, this construction, when applied to linear motors of the same stroke, can contribute to reducing the size and weight of the motor. In addition, the above construction, in which the magnetic circuit can be divided into halves, can prevent the magnetic saturation of the outer yokes 4 and/or the center yoke 2. In other words, the above construction contributes to obtaining thin-walled, lightweight yoke members.

Figure 7:
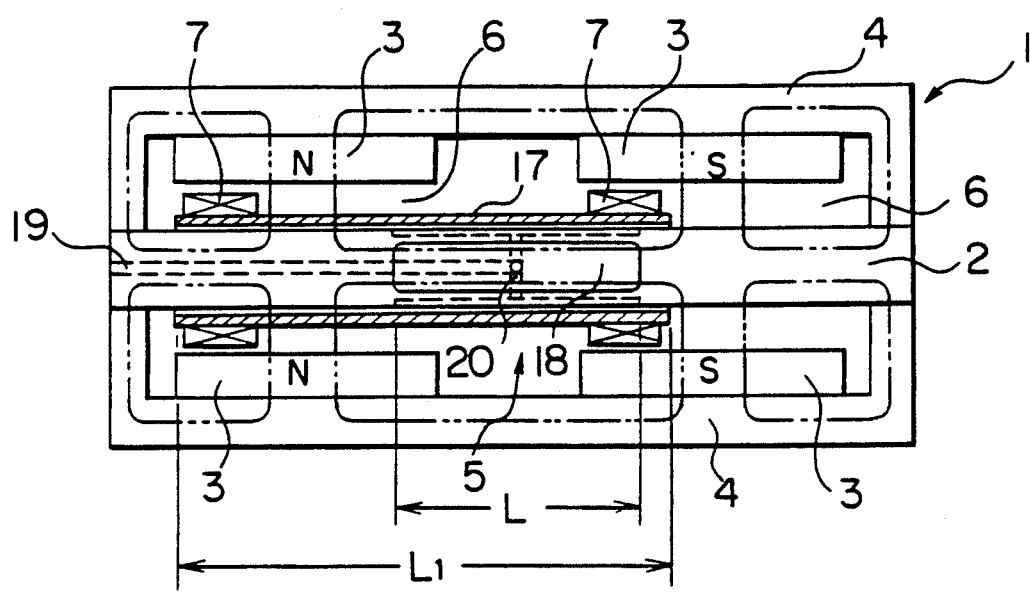

FIG. 7 is a partially sectional side view illustrating the third embodiment of this invention. Like part are indicated by like reference numerals used in FIGS. 4 through 6. In FIG. 7, the permanent magnets are disposed in such a manner that magnetic poles of different polarities N and S appear alternately on the inside surface of both ends of the outer yoke 4. Next, the coils comprising the movable member 5 are wound in different directions on the outer circumferential surface of both ends of the sleeve 17.

With the above construction, the movable member 5 can be moved in the axial direction, as in the case of the first and second embodiments, as current flows in the coils 7 since three groups of left, right and central megnetic fluxes as shown by alternate long and short dash lines in FIG. 7 can be formed between the center yoke 2 and the outer yokes 4, and the coils are disposed on the parallel portions of these magnetic fluxes. As with the above-mentioned two embodiments, this embodiments also contributes to increasing the stroke of the movable member 5, obtaining thin-walled yoke members, and reducing the size and weight of the linear motor.

In the above-mentioned embodiments, the cross-sectional shape of the center and outer the yokes is square, but the same effects can be achieved with yokes of a circular or any other geometrical shape. The material of the sleeve, which should preferably be light in weight in terms of efficiency, is desired to be aluminum and/or aluminum alloy, but is not necessary be limited to such materials. The material of the center and outer yokes may be made of any ferromagnetic materials other than steel. The shape and dimensions of the recess, air intake vent, air inlet may be appropriately determined, taking into consideration the required thrust, specific applications and other factors.

Having the aforementioned constructions and operations, this invention can achieve the following effects.

(1) The construction in which the thrust generator and the bearing are integrated, eliminates the need for other support mechanisms and allows the size of the drive unit to be reduced.

(2) Since the linear motor incorporates a static-pressure gas bearing operation is quite smooth and minimal vibration components are involved at the travelling and stop of the motor. This contributes to a substantial improvement in accuracy of the linear motor, making the motor suitable for optical instruments and precision machinery.

(3) Since gas is supplied at all times and forcibly circulated between the movable member and the center yoke, the coil can be prevented from being heated, and current fed to the coil can be increased. This results in increased thrust.

What is claimed is:

1. A linear motor comprising a center yoke having two ends and made of a ferromagnetic material; outer yokes made of a ferromagnetic material, having permanent magnets, each having magnetic poles on the inner and outer surfaces thereof and fixed to the inside surface of the outer yokes, and disposed outside the center yoke with both ends thereof being magnetically couples; and a movable member having coils wound on the outer circumference thereof and axially movably disposed in a gap between the center yoke and the outer yokes, characterized in that a plurality of recesses having an axial length of L are provided on the outer circumferential surface of said center yoke, an air intake vent connecting to said recesses is provided on said center yoke, and a sleeve facing said recesses and having an axial length of $L_1$, which is larger than the axial length L of said recesses, is provided on said movable member; said recesses and said sleeve forming a staticpressure gas bearing.

2. A linear motor as set forth in claim 1 wherein said outer yokes are split at the center thereof, said permanent magnets are fixedly fitted to the inside surfaces of said outer yokes in such a manner that magnetic poles of the same polarity appear on the inside surface of said permanent magnets, and coils each wound in the same direction are provided on both ends of said sleeve.

3. A linear motor as set forth in claim 1 wherein said permanent magnets are fixedly fitted to the inside surface of both ends of said outer yokes in such a manner that magnetic poles of different polarities appear on the inside surface of said permanent magnets, and coils each wound in different directions are provided on both ends of said sleeve.

* * * * *